United States Patent
Makino et al.

(10) Patent No.: US 11,909,267 B2
(45) Date of Patent: Feb. 20, 2024

(54) PERMANENT MAGNET ROTARY ELECTRIC MACHINE INCLUDING FLUX BARRIERS SHAPED ALONG FLUX LINES

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Hiroaki Makino, Fuchu (JP); Makoto Matsushita, Fuchu (JP); Katsutoku Takeuchi, Kokubunji (JP); Daisuke Misu, Yokohama (JP); Fumiaki Ito, Fuchu (JP); Masakatsu Matsubara, Mie (JP); Mikio Takabatake, Tsurumi (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 547 days.

(21) Appl. No.: 17/149,819

(22) Filed: Jan. 15, 2021

(65) Prior Publication Data
US 2021/0135521 A1 May 6, 2021

Related U.S. Application Data

(63) Continuation of application No. PCT/JP2019/030611, filed on Aug. 2, 2019.

(30) Foreign Application Priority Data

Aug. 3, 2018 (JP) .................................. 2018-147037

(51) Int. Cl.
*H02K 1/276* (2022.01)

(52) U.S. Cl.
CPC ....... *H02K 1/2766* (2013.01); *H02K 2213/03* (2013.01)

(58) Field of Classification Search
CPC .... H02K 1/2766; H02K 1/276; H02K 1/2753; H02K 1/274; H02K 2213/03
(Continued)

(56) References Cited

U.S. PATENT DOCUMENTS

| 2008/0007131 A1* | 1/2008 | Cai | ...................... H02K 1/2766 310/156.01 |
| 2012/0194026 A1* | 8/2012 | Matsuoka | ............ H02K 1/2766 310/156.53 |

(Continued)

FOREIGN PATENT DOCUMENTS

| JP | 2012-178921 A | 9/2012 |
| JP | 2012-178922 A | 9/2012 |

(Continued)

OTHER PUBLICATIONS

International Search Report dated Oct. 21, 2019 in PCT/JP2019/030611 filed on Aug. 2, 2019, 2 pages.

(Continued)

*Primary Examiner* — Michael Andrews
(74) *Attorney, Agent, or Firm* — Maier & Maier, PLLC

(57) ABSTRACT

According to one embodiment, a first permanent magnet and a second permanent magnet are disposed in each magnetic pole of a rotor core. When angular coordinates of intersections of a flux line in a d-axial direction passing an outer end A1 of the first permanent magnet, a flux line in the d-axial direction passing through an inner end A2 of the first permanent magnet, a flux line in the d-axial direction passing an outer end B1 of the second permanent magnet, a (Continued)

flux line in the d-axial direction passing an inner end B2 of the second permanent magnet and a circumscribing circle of the rotor core are respectively defined as $\theta_{dA1}$, $\theta_{dA2}$, $\theta_{dB1}$ and $\theta_{dB2}$, the $\theta_{dA1}$, $\theta_{dA2}$, $\theta_{dB1}$ and $\theta_{dB2}$ satisfy a formula ($-34/p<(\theta_{dB1}-\theta_{dA1})<22/p$, $-34/p<(\theta_{dB2}-\theta_{dA2})<22/p$).

8 Claims, 10 Drawing Sheets

(58) Field of Classification Search
USPC .......................................... 310/156.53, 156.56
See application file for complete search history.

(56) References Cited

U.S. PATENT DOCUMENTS

| | | | | |
|---|---|---|---|---|
| 2013/0113328 A1* | 5/2013 | Kogure | ................ | H02K 1/274 |
| | | | | 310/156.53 |
| 2015/0102695 A1* | 4/2015 | Zhang | ................ | H02K 1/2766 |
| | | | | 310/156.53 |
| 2018/0183286 A1* | 6/2018 | Nakano | ................ | H02K 1/2766 |
| 2018/0241262 A1* | 8/2018 | Tang | ................ | H02K 21/145 |
| 2019/0173336 A1* | 6/2019 | Takeuchi | ................ | H02K 1/246 |
| 2019/0207441 A1 | 7/2019 | Takeuchi et al. | | |

FOREIGN PATENT DOCUMENTS

| | | |
|---|---|---|
| JP | 2015-133825 A | 7/2015 |
| JP | 2017-192221 A | 10/2017 |
| JP | 2018-046722 A | 3/2018 |
| WO | WO 2017/061305 A1 | 4/2017 |

OTHER PUBLICATIONS

Kondo et al., "Rotor Design of Permanent Magnet Synchronous Motor for Railway Vehicle", IEEJ Transactions on Industry Applications, vol. 124, No. 1, 2004, 18 pages (with English Machine Translation).

* cited by examiner

PERMANENT MAGNET ROTARY ELECTRIC MACHINE INCLUDING FLUX BARRIERS SHAPED ALONG FLUX LINES

CROSS-REFERENCE TO RELATED APPLICATIONS

This application is a Continuation Application of PCT Application No. PCT/JP2019/030611, filed Aug. 2, 2019 and based upon and claiming the benefit of priority from Japanese Patent Application No. 2018-147037, filed Aug. 3, 2018, the entire contents of all of which are incorporated herein by reference.

FIELD

Embodiments described herein relate generally to a rotor of a permanent magnet-type rotary electric machine.

BACKGROUND

Recently, research and development of permanent magnets have been remarkably advanced, and therefore permanent magnets of a high magnetic energy product are developed. Permanent magnet-type rotary electric machines which employ such a permanent magnet are applied as electric motors or power generators of electric trains and vehicles. Generally, a permanent magnet-type rotary electric machine comprises a cylindrical hollow stator and a columnar rotor rotatably supported inside the stator. The rotor comprises a rotor core and a plurality of permanent magnets embedded in the rotor core.

In such a permanent magnet-type rotary electric machine, a technique to reduce iron loss of the rotor core has been proposed, in which a plurality of layers each constituted by a cavity layer (a flux barrier) and a permanent magnet are provided in each magnetic pole. There has been conventionally known a technique for the case where a single cavity layer comprises a permanent magnet inside, to achieve a high torque by shaping the layer into a shape made along a flux line by the reaction of the armature. In the case where there are a plurality of cavity layers, which include those do not comprise a permanent magnet inside, a high torque can be achieved similarly by shaping each layer made along the flux line.

However, in a rotor with a plurality of cavity layers, if permanent magnets in each cavity layer are not formed in appropriate shape, dimensions and arrangement, a d-axial magnetic flux and a q-axial magnetic flux in the rotor interfere with each other, thus decreasing a total torque.

DETAILED DESCRIPTION

Figure 1:
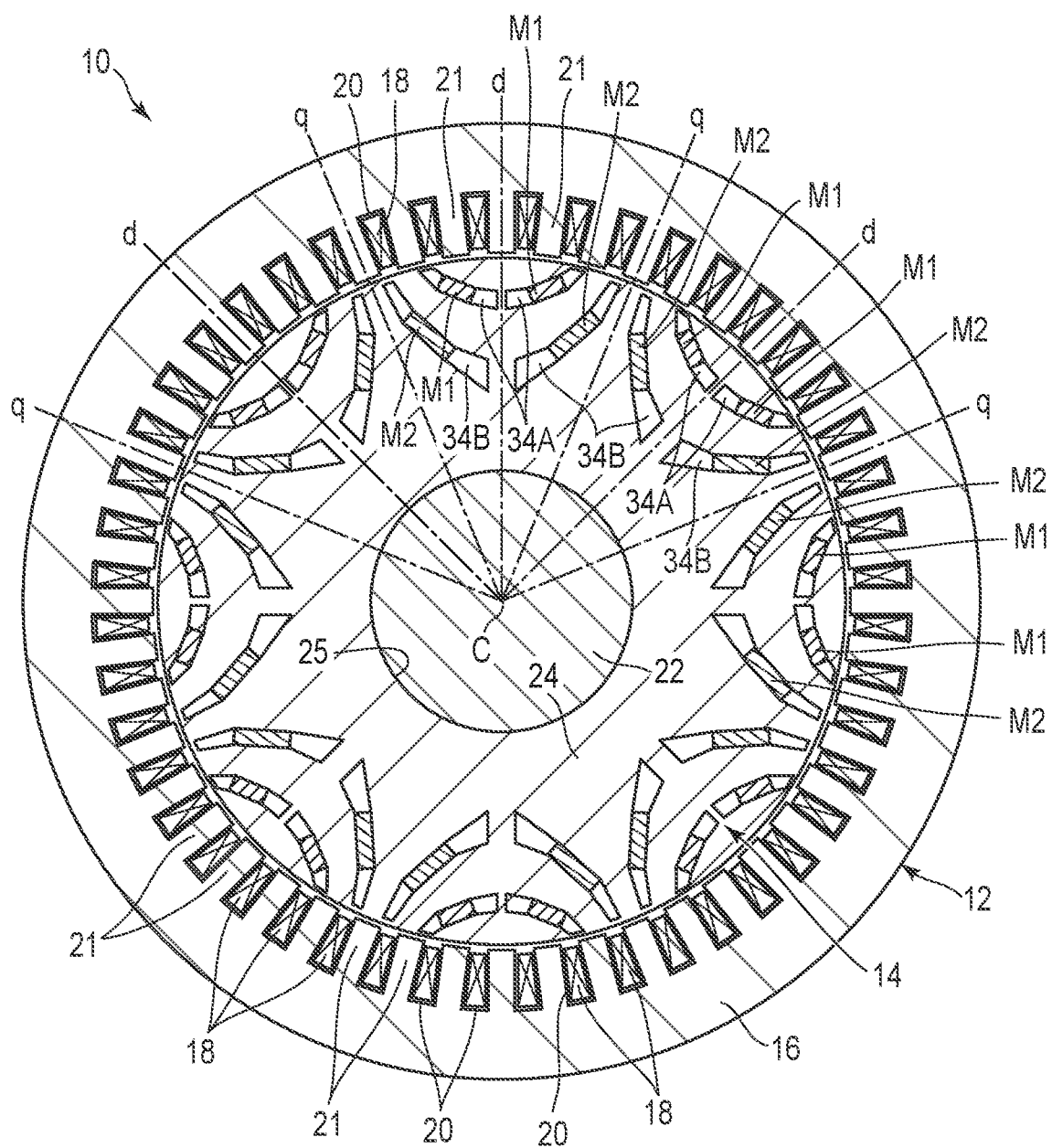
FIG. 1 is a lateral cross-section of a permanent magnet-type rotary electric machine according to an embodiment.

Embodiments will be described hereinafter with reference to the accompanying drawings.

In general, according to one embodiment, a rotor of a rotary electric machine comprises a shaft rotatable around a central axis, a rotor core comprising a plurality of magnetic poles arranged along a circumferential direction and fixed coaxially to the shaft and a plurality of first permanent magnets and second permanent magnets, disposed in a plurality of layers of flux barriers formed in the plurality of magnetic poles, respectively. In a lateral cross section of the rotor core, normal to the central axis, when an axis extending from the central axis in a diametrical direction between each adjacent pair of the magnetic poles is referred to as a q-axis, and an axis electrically normal to the q-axis is referred to as a d-axis in each of the magnetic poles, the flux barrier of each of the magnetic poles includes a first flux barrier provided between the d-axis and the q-axis and a second flux barrier provided in an inner circumferential side the rotor core with respect to the first flux barrier between the d-axis and the q-axis. The first flux barrier is defined between a first outer circumferential-side edge extending from a vicinity of the d-axis to a vicinity of an outer circumference of the rotor core, and a first inner circumferential-side edge extending from a vicinity of the d-axis to a vicinity of the circumference and located on an inner circumferential side of the rotor core with respect to the first outer circumferential-side edge with a gap therebetween, and the second flux barrier is defined between a second outer circumferential-side edge located on an inner circumferential side of the rotor core with respect to the first inner circumferential-side edge with a gap therebetween and extending from the vicinity of the d-axis to the vicinity of the outer circumference of the rotor core, and a second inner circumferential-side edge extending from the vicinity of the d-axis to the vicinity of the circumference and located the inner circumferential side of the rotor core with respect to the second outer circumferential-side edge with a gap therebetween. Each of the first permanent magnets has a cross-sectional shape comprising a first long side with an inner end and an outer end, a first short side intersecting the inner end of the first long side and a second short side intersecting the outer end of the first long side, the first permanent magnet is disposed in the first flux barrier in a state that the first long side opposes the first outer circumferential-side edge of the first flux barrier, the inner end and the first short side are located on a side of the d-axis, and the outer end of the first long side and the second short side are located in the outer circumferential side of the rotor core, and each of the second permanent magnets has a cross-sectional shape comprising a second long side with an inner end and an outer end, a first short side intersecting the inner end of the second long side and a second short side intersecting the outer end of the second long side, the second permanent magnet is disposed in the second flux barrier in a state that the second long side opposes the second outer circumferential-side edge of the second flux barrier, the inner end and the first short side are located on a side of the d-axis, and the outer end of the second long side and the second short side are located in the outer circumferential side. Where R: a radius of a circle around the central axis, which circumscribes the circumference of the rotor core; r: radial coordinates of a polar coordinate system interposed between with the d-axis and q-axis with respect to the central axis as a central point; θ: angular coordinates of the polar coordinate system interposed between with the d-axis and q-axis with respect to the central axis; p: the number of poles pairs (the number of magnetic poles/2); $θ_a$: angular coordinates of an arbitrary point of the circumscribing circle, a flux line in a d-axial direction passing through coordinates (R, $θ_a$) is defined by formula (1) provided below and a flux line in a q-axial direction passing through coordinates (R, $θ_a$) is defined by formula (2) provided below. When angular coordinates of an intersection of the flux line in the d-axial direction passing through the outer end A1 of the first long side of the first permanent magnet and the circumscribing circle are defined as $θ_{dA1}$, and angular coordinates of an intersection of the flux line in the d-axial direction passing through the inner end A2 of the first long side of the first permanent magnet and the circumscribing circle are defined as $θ_{dA2}$, and angular coordinates of an intersection of the flux line in the d-axial direction passing through the outer end B1 of the second long side of the second permanent magnet and the circumscribing circle are defined as $θ_{dB1}$, and angular coordinates of an intersection of the flux line in the d-axial direction passing through the inner end B2 of the second long side of the second permanent magnet and the circumscribing circle are defined as $θ_{dB2}$, the $θ_{dA1}$, $θ_{dA2}$, $θ_{dB1}$ and $θ_{dB2}$ satisfy formula (3) provided below.

Throughout the embodiments, common configurations are given the same symbol, and duplicated explanations are omitted. Each figure is a schematic view for explaining the embodiments and facilitating understandings thereof, and the shape, the dimensions, the ratio and the like in the figure may be different from those of the actual apparatus, but they can be appropriately designed and changed by referring to the following descriptions and publicly known techniques.

Figure 2:
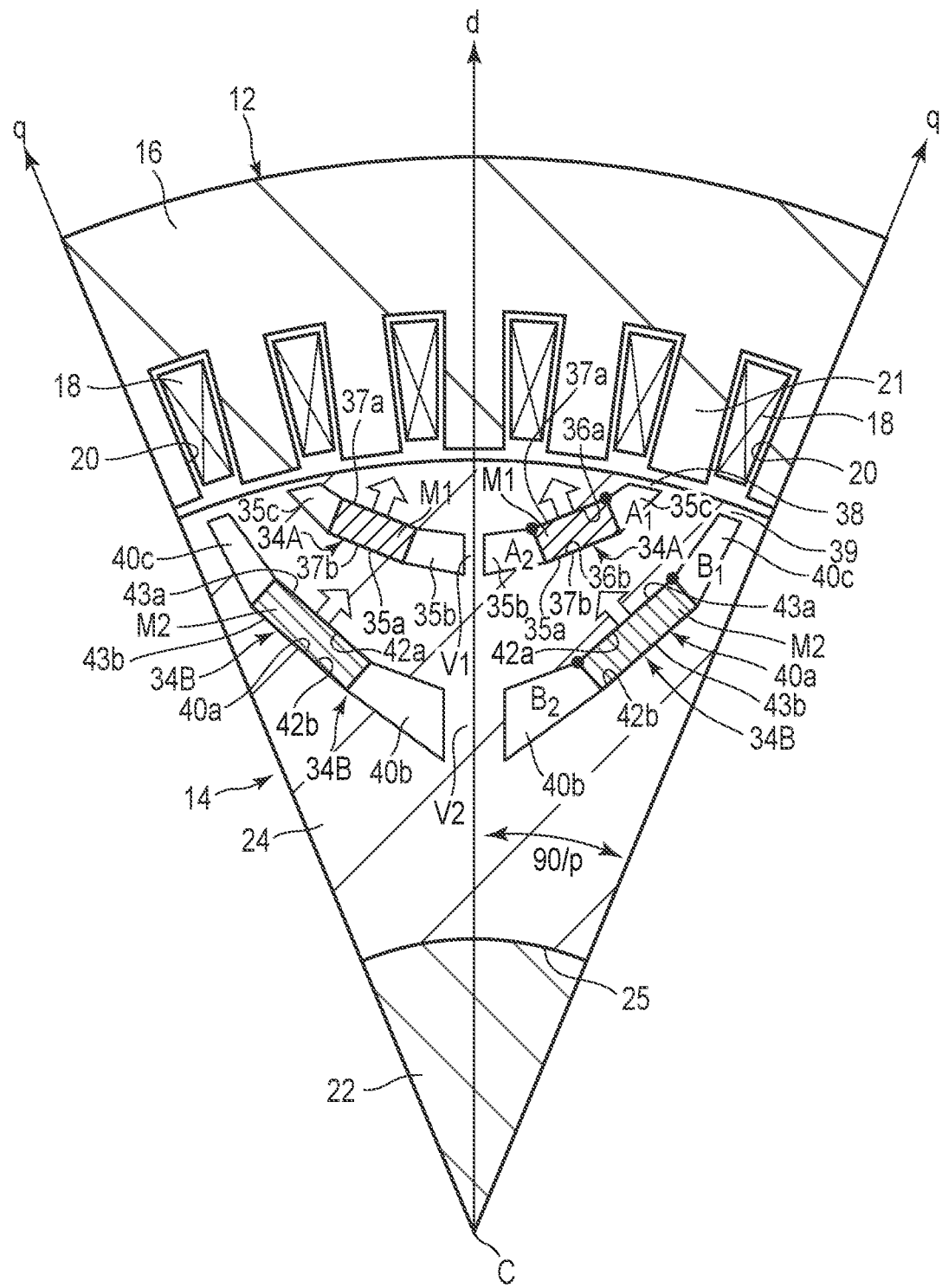
FIG. 2 is an enlarged lateral cross-sectional view of one magnetic pole portion of the rotary electric machine.

FIG. 1 is a lateral cross-section of a permanent magnet-type rotary electric machine according to an embodiment. FIG. 2 is an enlarged lateral cross-sectional view of a portion (one magnetic pole portion) of the rotary electric machine.

As shown in FIG. 1, a rotary electric machine 10 is configured, for example, as an inner rotor-type rotary electric machine and comprises an annular or cylindrical stator 12 supported on a fixed frame (not shown) and a rotor 14 supported inside the stator 12 so as to be rotatable around a central axis C and coaxial with the stator 12. The rotary electric machine 10 is applicable to, for example, a main electric motor, a drive motor or a power generator in railroad vehicles, hybrid vehicles (HEV) and electric vehicles (EV).

The stator 12 comprises a cylindrical stator core 16 and an armature coil 18 wound around the stator core 16. The stator core 16 is configured by laminating a great number of annular electromagnetic steel plates of a magnetic material such as silicon steel, coaxially one on another. In an inner circumferential portion of the stator core 16, a plurality of slots 20 are formed. The slots 20 are arranged along a circumferential direction at equal intervals. Each slot 20 is opened in an inner circumferential surface of the stator core 16 and extends radially from the inner circumferential surface. Further, each slot 20 extends over a full axial length of the stator core 16. With the plurality of slots 20 thus formed, the inner circumferential portion of the stator core 16 are formed into a plurality of (for example, forty eight in this embodiment) stator teeth 21 facing the rotor 14. The armature coil 18 is embedded in a plurality of slots 20 and wound around each of the stator teeth 21. When applying current to the armature coil 18, a predetermined flux linkage is formed in the stator 12 (the stator teeth 21).

The rotor 14 includes a columnar shaft (rotating shaft) 22, a cylindrical rotor core 24 fixed to, substantially, an axial central portion of the shaft 22 and a plurality of first permanent magnets M1 and second permanent magnets M2 embedded in the rotor core 24. The shaft 22 is supported rotatably around the central axis C by a bearing (not shown). The rotor 14 is disposed coaxially inside the stator 12 with a slight gap therebetween. In other words, an outer circumferential surface of the rotor core 24 opposes the inner circumferential surface of the stator 12 with a slight gap therebetween. The rotor core 24 comprises an inner hall 25 formed coaxially with the central axis C. The shaft 22 is passed through the inner hall 25 to engage therewith, and extend coaxially with the rotor core 24. The rotor core 24 is configured as a layered body in which a great number of annular electromagnetic steel plates of a magnetic material such as silicon steel are coaxially laminated.

In this embodiment, the rotor 14 is set to be a plurality of, for example, eight magnetic poles. In the rotor core 24, axes each passing through the central axis C and a border between each adjacent pair of magnetic poles to extend in a diametrical direction or a radial direction with respect to the central axis C are referred to as q-axes and axes each located electrically distant at an angle of 90 degrees from the respective q-axis (axes each electrically normal to q-respective axes) are referred to as d-axes. Here, the q-axes are set along directions in which the flux linkage to be formed by the stator 12 easily flow. The d-axes and the q-axes are provided alternately along a circumferential direction of the rotor core 24 in a predetermined phase. One magnetic pole of the rotor core 24 refers to a region between adjacent q-axes (an octant angular region). Thus, the rotor core 24 is configured as octapolar (eight magnetic poles). A circumferential center of one magnetic pole is a d-axis.

As shown in FIGS. 1 and 2, in the rotor core 24, a plurality of, for example, two or four permanent magnets are embedded in each magnetic pole. In this embodiment, each magnetic pole comprises two of the first permanent magnets M1 and two of the second permanent magnets M2.

On respective sides of each d-axis along the circumferential direction of the rotor core 24, a pair of first magnet embedding holes (the first cavity layer or the first flux barrier) 34A to accommodate the two first permanent magnets M1 are formed. Further, a pair of second magnet embedding holes (the second cavity layer or the second flux barrier) 34B to accommodate the two second permanent magnets M2 are formed on respective sides of each d-axis. The second magnet embedding holes 34B are provided with an interval therebetween on an inner circumferential side of the rotor core 24 with respect to the first magnet embedding holes 34A.

In each magnetic pole, the first magnet embedding holes 34A are each provided between the respective d-axis and the respective q-axis, so as to extend from the vicinity of the d-axis to the vicinity of the outer circumferential of the rotor core 24. The second magnet embedding holes (the second cavity layer) 34B are each provided with an interval therebetween on the inner circumferential side of the rotor core 24 with respect to the first magnet embedding holes 34A between the respective d-axis and the respective q-axis and each extends from the vicinity of the d-axis to the vicinity of the outer circumference. In this embodiment, the two first magnet embedding holes 34A are formed to be line-symmetrical with respect to the respective d-axis, and the two second magnet embedding holes 34B are formed to be line-symmetrical with respect to the respective d-axis.

The two first permanent magnets M1 are inserted and disposed in the first magnet embedding holes 34A, respectively, and fixed to the rotor core 24 by, for example, an adhesive. The two second permanent magnets M2 are inserted and disposed in the second magnet embedding holes 34B, respectively, and fixed to the rotor core 24 by, for example, an adhesive.

Each of the first magnet embedding holes 34A and the second magnet embedding holes 34B penetrates the rotor core 24 along its axial direction to extend. The first magnet embedding holes 34A each have substantially a rectangular cross-sectional shape, and are inclined with respect to the d-axis. As viewed in a cross section normal to the central axis C of the rotor core 24, the two first magnet embedding holes 34A are disposed, for example, in substantially a V-shaped manner. In other words, inner circumferential edges of the two first magnet embedding holes 34A are both located adjacent to the d-axis, so as to oppose each other with a slight gap therebetween. In the rotor core 24, a small-width magnetic path narrow portion (a first bridge portion) V1 is formed between inner ends (ends on the d-axis side) of the two first magnet embedding holes 34A. Outer ends (ends on an outer circumferential surface side) of the two first magnet embedding holes 34A are spaced apart from the respective d-axis along a circumferential direction of the rotor core 24 and are located to the vicinities of the outer circumference of the rotor core 24. The outer end of each first magnet embedding hole 34A is located substantially midway between the d-axis and the respective q-axis. In the rotor core 24, a small-width magnetic path narrow portion (a bridge portion) 38 is formed between the outer end of each first magnet embedding hole 34A and the outer circumference of the rotor core 24. Thus, the two first magnet embedding holes 34A are arranged such that the distance from the d-axis gradually expands from the inner ends towards the outer ends, respectively.

The first magnet embedding holes (the first flux barrier) 34A are defined between a first circumferential-side edge 36a extending from the vicinity of the d-axis to the vicinity of the outer circumference of the rotor core 24, and a first inner circumferential-side edge 36b extending from the vicinity of the d-axis to the vicinity of the outer circumference and facing the first circumferential-side edge 36a with a gap therebetween on the inner circumferential side of the rotor core 24. The first magnet embedding holes 34A each includes a rectangular magnet loading region 35a whose shape corresponds to the cross-section of the first permanent magnet M1, and a circumferential-side cavity 35c and an inner circumferential-side cavity 35b, which extend from respective longitudinal ends of the magnet loading region 35a.

The magnet loading region 35a is defined between the outer circumferential-side edge 36a, which is substantially flat and the inner circumferential-side edge 36b, which is substantially flat and oppose parallel to the outer circumferential side edge 36a with a gap therebetween. The inner circumferential-side cavity 35b extends from the inner end of the magnet loading region 35a towards the d-axis. The outer circumferential side cavity 35c extends from the outer end (an outer circumferential end of the rotor core) of the magnet loading region 35a towards the outer circumference of the rotor core 24. The inner circumferential-side cavities 35b of the two first magnet embedding holes 34A are arranged to oppose each other while interposing the d-axis and the first bridge portion V1 therebetween. The bridge portion 38 is defined between the outer circumferential-side cavity 35c and the outer circumference of the rotor core 24.

The inner circumferential-side cavity 35b and the outer circumferential-side cavity 35c each function as a flux barrier which suppress leaking of magnetic flux from both longitudinal ends of the first permanent magnet M1 to the rotor core 24, and further contribute to weight reduction of the rotor core 24.

The first permanent magnets M1 are each formed into, for example, a rectangular slim flat plate shape, and it has a length substantially equal to an axial length of the rotor core 24. The first permanent magnets M1 each may be configured by combining a plurality of magnets obtained by dividing it along its axial direction (longitudinal direction), in which case, a total length of the plurality of magnets is set to be substantially equal to the axial length of the rotor core 24. The first permanent magnets M1 are each inserted to the respective first magnet embedding hole 34A and are embedded in the rotor core 24 over substantially its full length.

Each of the first permanent magnet M1 has a rectangular (for example, rectangular parallelepiped) cross-section shape with a first long side (an outer circumferential-side long side) 37a and an inner circumferential-side long side 37b, which oppose parallel to each other, and a pair of short sides (a first short side and a second short side) opposing each other. The first long side 37a comprises an outer end (an outer corner) (an end where the first long side and one short side intersect each other) A1, located in the outer circumferential side of the rotor core 24 and an inner end (an inner corner) (an end edge where the first long side and the other short side intersect each other) A2 located in a d-axis side. The first permanent magnet M1 is loaded in a substantially central portion of the magnet embedding hole 34A along its longitudinal direction (extending direction), namely, the magnet loading region 35a, such that the first long side 37a opposes or abuts against the circumferential-side edge 36a, and the inner circumferential side long side 37b opposes or abuts against the inner circumferential-side edge 36b. The first permanent magnet M1, by a pair of corner portions thereof, abuts against stopper portions (corner portions) of the magnet loading region 35a, respectively. Thus, the first permanent magnet M1 is positioned in the respective magnet loading region 35a. As described above, the first permanent magnets M1 may be fixed to the rotor core 24 with an adhesives or the like. The two first permanent magnets M1 located on respective sides of each d-axis are arranged such that the distance from the d-axis gradually expands from the inner ends towards the outer ends.

Each of the first permanent magnets M1 is magnetized in a direction intersecting, for example, normal to, the first long side 37*a* and the inner circumferential-side long side 37*b*. The two first permanent magnets M1 located on respective sides of the d-axis are arranged such that the magnetization directions are identical to each other. Further, the two first permanent magnets M1 located on respective sides of each q-axis are arranged such that the magnetization directions are opposite to each other.

On the other hand, a pair of second magnet embedding holes (the second flux barrier) 34B are provided on the inner circumferential side of the rotor core 24 with respect to the first magnet embedding holes 34A. The second magnet embedding holes 34B each has substantially a rectangular cross-sectional shape, and are each inclined to the respective d-axis. As viewed in a section normal to the central axis C of the rotor core 24, the two second magnet embedding holes 34B are arranged into substantially a V-shaped manner. That is, inner ends (ends on the d-axis side) of the two second magnet embedding holes 34B are each located adjacent to the respective d-axis, and oppose each other via a slight gap therebetween. In the rotor core 24, a small-width magnetic path narrow portion (a second bridge portion) V2 is formed between the inner ends of the two second magnet embedding holes 34B. The outer ends (ends on the outer circumferential surface side) of the second magnet embedding holes 34B are spaced apart from the d-axis along the circumferential direction of the rotor core 24 and are located in the vicinity of the outer circumference of the rotor core 24 and the vicinity of the respective q-axis. Thus, the outer ends of the second magnet embedding holes 34B oppose outer ends of second magnet embedding holes 34B of an adjacent magnetic pole while interposing the respective q-axis therebetween. In the rotor core 24, a small-width magnetic path narrow portion (a bridge portion) 39 is formed between an outer end of each of the second magnet embedding holes 34B and the outer circumferential edge of the rotor core 24. Thus, the two second magnet embedding holes 34B are arranged such that the distance from the d-axis gradually expands from the inner ends as towards the outer ends. The second magnet embedding holes 34B are disposed to be symmetrical to each other with respect to the d-axis.

The second magnet embedding holes 34B are defined between a second inner circumferential-side edge 42*b* which locate in the inner circumferential side of the rotor core 24 with respect to the first inner circumferential-side edges 36*b* of the first magnet embedding holes 34A and extend from the vicinity of the respective d-axis to the vicinity of the outer circumference of the rotor core 24, and a second inner circumferential-side edge 42*a* extending from the vicinity of the d-axis to the vicinity of the outer circumference and opposing the inner circumferential side of the rotor core with respect to the second circumferential-side edge 42*a* with a gap therebetween. The second magnet embedding holes 34B each comprises a rectangular magnet loading region 40*a* whose shape corresponds to the cross-sectional shape of the second permanent magnet M2, and an inner circumferential side cavity 40*b* and an outer circumference side cavity 40*c* which extend from respective longitudinal ends of the magnet loading region 40*a*.

The magnet loading region 40*a* is defined between the second circumferential side edge 42*a*, which is flat, and the second inner circumferential-side edge 42*b* which is flat and opposes parallel to the outer circumferential side edge 42*a* with a gap therebetween. The inner circumferential side cavity 40*b* extends from an inner end (an end on the d-axis side) of the magnet loading region 40*a* towards the d-axis. The outer circumferential-side cavity 40*c* extends from an outer end (an end on the outer circumferential side of the rotor core) of the magnet loading region 40*a* towards the outer circumference of the rotor core 24. The inner circumferential-side cavities 40*b* of the two second magnet embedding holes 34A are disposed to oppose each other while interposing the d-axis and the second bridge portion V2. The bridge portion 39 is defined between the outer circumferential side cavity 40*c* and the outer circumference of the rotor core 24.

The inner circumferential side cavity 40*b* and the outer circumferential side cavity 40*c* each function as a flux barrier which suppress the leaking of magnetic flux from both longitudinal ends of the second permanent magnet M2 to the rotor core 24 and further contribute to the weight reduction of the rotor core 24.

The second permanent magnets M2 are each formed into, for example, a rectangular slim flat plate shape, and have a length substantially equal to the axial length of the rotor core 24. The second permanent magnets M2 each may be configured by combining a plurality of magnets obtained by dividing it along its axial direction (longitudinal direction), in which case, a total length of the plurality of magnets is set to be substantially equal to the axial length of the rotor core 24. The second permanent magnets M2 are each inserted to the respective second magnet embedding hole 34B and are embedded in the rotor core 24 over substantially its full length. In this embodiment, the second permanent magnets M2 have a width (a longitudinal dimension in cross section) greater than that of the first permanent magnets M1.

Each of the second permanent magnets M2 has a rectangular shape (for example, rectangular parallelepiped) in cross section, and comprises a second long side (outer circumferential-side long side) 43*a* and an inner circumferential side long side 43*b*, which oppose parallel to each other, and a pair of short sides (a first short side and a second short side) opposing each other. The second long side 43*a*comprises an outer end (an outer corner) (an end where the second long side and one short side intersect each other) B1 located in the outer circumferential side of the rotor core 24 and an inner end (an inner corner) (an end where the second long side and the other short side intersect each other) B2 located in the d-axis side. The second permanent magnets M2 are each loaded in substantially a longitudinal central portion of the respective magnet embedding hole 34B, namely, the magnet loading region 40*a*, such that the second long side 43*a* opposed or abuts against the circumferential-side edge 42*a* and the inner circumferential-side long side 43*b* opposes or abuts against the inner circumferential-side edge 42*b*. The second permanent magnets M2, by a pair of corner portions thereof, each abut against stopper portions (corner portions) of the magnet loading regions 40*a*, respectively. Thus, the second permanent magnets M2 are positioned in the magnet loading regions 40*a*, respectively. As described above, the second permanent magnets M2 may be fixed to the rotor core 24 with an adhesives or the like. The two second permanent magnets M2 located on respective sides of each d-axis are arranged such that the distance from the d-axis gradually expands from the inner ends towards the outer ends.

Each of the second permanent magnets M2 is magnetized in a direction intersecting, for example, normal to, the second long side 43*a* and the inner circumferential-side long side 43*b*. The two second permanent magnets M2 are arranged such that the magnetization directions thereof are identical to each other. Further, the two second permanent magnets M2 located on respective sides of the q-axis are disposed such that the magnetization directions thereof are opposite to each other. In each one magnetic pole, the second permanent magnet M2 is magnetized to the same direction as that of the first permanent magnet M1.

With the first permanent magnet M1 and the second permanent magnet M2 arranged as discussed above, the rotary electric machine 10 is configured as a permanent magnet-embedded rotary electric machine with eight poles (four pairs of poles) and forty eight slots, in which the front and back of an N-pole and an S-pole of the first permanent magnets M1 and the second permanent magnets M2 are alternately arranged for each adjacent pair of magnetic poles, and the coils are formed by single-layer distributed winding.

Next, as to the rotor of the rotary electric machine configured as discussed above, a method to set appropriate arrangement and dimensions of the magnet embedding holes (flux barriers), the first permanent magnets and the second permanent magnet will be described.

Figure 3:
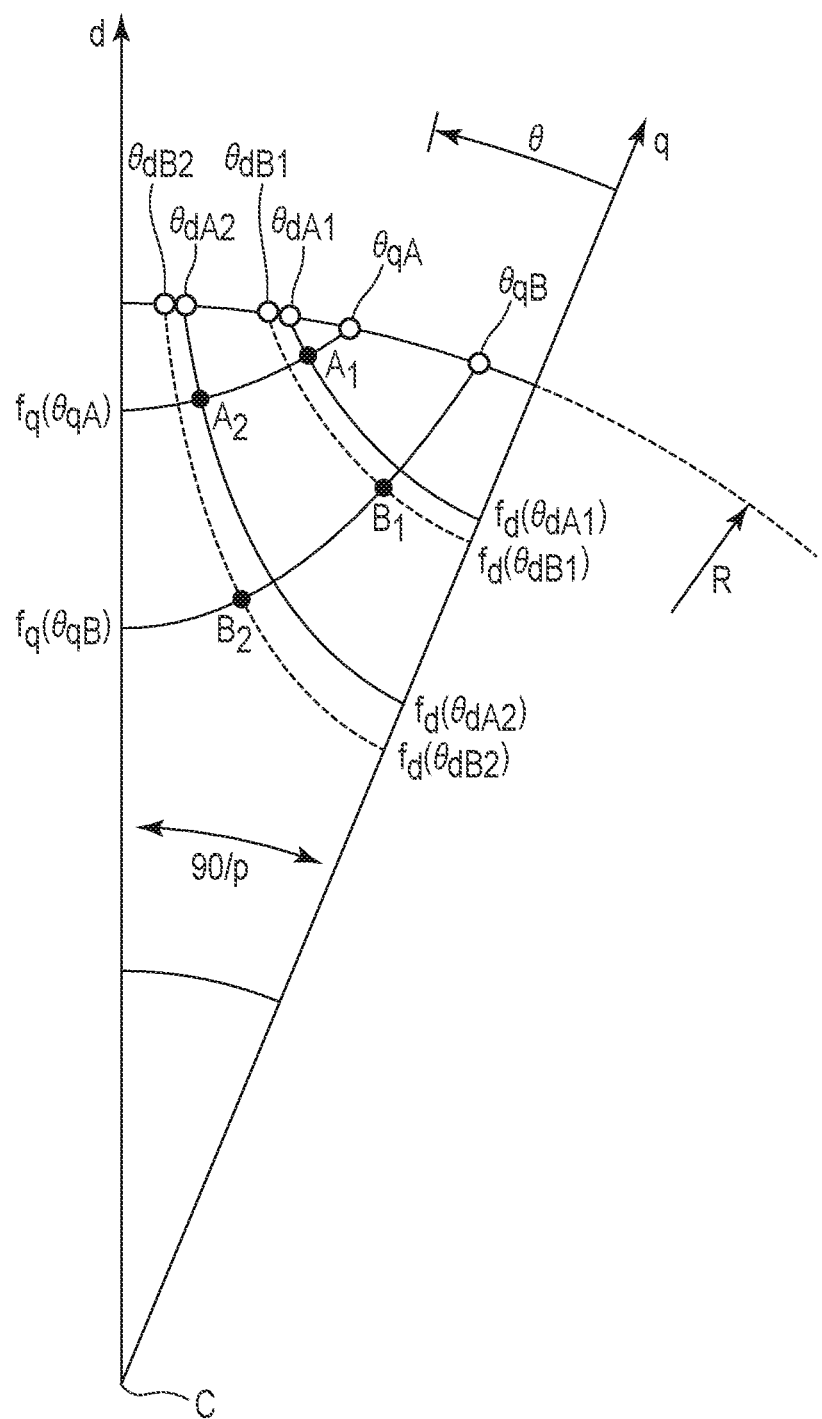
FIG. 3 is a diagram illustrating lines of magnetic flux for setting arrangement and dimensions of permanent magnets in a rotor of the rotary electric machine.

FIG. 3 is a diagram schematically showing a flux line used in the method for setting the arrangement and dimensions of the permanent magnet of the rotary electric machine of the embodiment. In FIG. 3, R represents a radius of a circle around the central axis C, which circumscribes the circumference of the rotor core 24; r represents radial coordinates of a polar coordinate system interposed between with the d-axis and q-axis with respect to the central axis C as a central point; e represents angular coordinates of the polar coordinate system interposed between the d-axis and q-axis with respect to the central axis; p represents the number of pairs of poles pairs (the number of magnetic poles/2); and $\theta_{ea}$ represents angular coordinates of an arbitrary point of the circumscribing circle ($\theta_d$: angular coordinates of the flux line in the d-axial direction and $\theta_q$: angular coordinates of the flux line in the q-axial direction). With respect to the angle θ, when the counterclockwise direction with reference to the q-axis is positive, a flux line $f_d(\theta_d)$ (to be referred to as d-axial flux line) in the d-axial direction passing through the coordinates $\theta_d$ on the outer circumferential surface of the rotor 14 is defined by formula (1) below in terms of a cylinder coordinate system hyperbolic function.

$$(r/R)^p \cdot \cos(p\theta) = \cos(p\theta_d) \quad (1)$$

Similarly, a flux line $f_q(\theta_q)$ (to be referred to as a q-axial flux line) in the q-axial direction passing through the coordinates $\theta_q$ on the outer circumference of the rotor 14 is defined by formula (2) below in terms of a cylinder coordinate system hyperbolic function.

$$(r/R)^p \cdot \sin(p\theta) = \sin(p\theta_q) \quad (2)$$

Intersection coordinates ($r_{dq}$, $\theta_{dq}$) between the d-axial flux line and the q-axial flux line are set to satisfy formula (3) below.

$$r_{dq} = R \cdot \{\sin^2(p\theta_q) + \cos^2(p\theta_d)\}^{1/2p} \quad (3)$$

$$\theta_{dq} = \frac{1}{p} \cdot \tan^{-1}(\sin(p\theta_q)/\cos(p\theta_d))$$

First, arbitrary angular coordinates (to be referred to as coordinates hereinafter), $\theta_{qA}$ and $\theta_{qB}$ are given onto the circumscribing circle of the rotor per one magnetic pole, and a first q-axial flux line $f_q(\theta_{qA})$ and a second q-axial flux line $f_q(\theta_{qB})$, which pass the respective coordinates are obtained from the formula (2). Here, it is assumed that $\theta_{qB}$ is a coordinate located on the q-axis side with respect to $\theta_{qA}$ ($\theta_{qA} > \theta_{qB}$). Similarly, arbitrary coordinates $\theta_{dA1}$, $\theta_{dA2}$ are given onto the circumscribing circle of the rotor, and a first d-axial flux line $f_d(\theta_{dA1})$ and a second d-axial flux line $f_d(\theta_{dA2})$, which pass the respective coordinates are obtained from the formula (1). Here, it is assumed that a coordinate $\theta_{dA1}$ is a coordinate located on the d-axis side with respect to a coordinate $\theta_{qA}$ ($\theta_{dA1} > \theta_{qA}$), and a coordinate $\theta_{dA2}$ is located on the d-axis side with respect to a coordinate $\theta_{dA1}$ ($\theta_{dA2} > \theta_{dA1}$). Let us now assume that an intersection A1 of the first q-axial flux line $f_q(\theta_{qA})$ and the first d-axial flux line $f_d(\theta_{dA1})$ and an intersection A2 of the first q-axial flux line $fq(\theta_{qA})$ and the second d-axial flux line $f_d(\theta_{dA2})$ are connected together to make a linear line (A1-A2), and a position where the linear line (A1-A2) coincides with a magnetizing surface (the first long side 37a) of the first permanent magnet M1 is set to be the position where the first permanent magnet M1 is to be placed. As to the dimensions of the first permanent magnet M1 are set such that the length of the first long side 37a coincides with the length of the linear line (A1-A2). In other words, the arrangement and dimensions of the first permanent magnet M1 are set such that the outer end (the outer corner) and the inner end (the inner corner) of the first long side 37a are located at the intersections A1 and A2, respectively.

The first magnet embedding holes 34A are formed and positioned such as to be along the first q-axial flux line $f_q(\theta_{qA})$ and further such that the outer circumferential-side edge 36a of the magnet loading region 35a coincides with the linear line (A1-A2).

Further, arbitrary angular coordinates (to be referred to as coordinates hereinafter), $\theta_{dB1}$ and $\theta_{dB2}$ are given onto the circumscribing circle of the rotor, and a third d-axial flux line $f_d(\theta_{dB1})$ and a fourth d-axial flux line $f_d(\theta_{dB2})$, which pass the respective coordinates are obtained from the formula (1). Note that the coordinates $\theta_{dB1}$ and $\theta_{dB2}$ are selected from those identical to the coordinates $\theta_{dA1}$ and $\theta_{dA2}$, respectively, or those located on the d-axis side with respect to the coordinates $\theta_{dA1}$ and $\theta_{dA2}$, respectively. Let us now assume that an intersection B1 of the second q-axial flux line $f_q(\theta_{qB})$ and the third d-axial flux line $f_d(\theta_{dB1})$ and an intersection B2 of the second q-axial flux line $f_q(\theta_{qB})$ and the fourth d-axial flux line $f_d(\theta_{dB2})$ are connected together to make a linear line (B1-B2), and a position where the linear line (B1-B2) coincides with a magnetizing surface (the second long side 43a) of the second permanent magnet M2 is set to be the position where the second permanent magnet M2 is to be placed. As to the dimensions of the second permanent magnet M2 are set such that the length of the second long side 43a coincides with the length of the linear line (B1-B2). In other words, the arrangement and dimensions of the second permanent magnet M2 are set such that the outer end (the outer corner) and the inner end (the inner corner) of the second long side 43a are located at the intersections B1 and B2, respectively.

The second magnet embedding holes 34B are formed and positioned such as to be along the second q-axial flux line $f_q(\theta_{qB})$ and further such that the outer circumferential-side edge 42a of the magnet loading region 40a coincides with the linear line (B1-B2).

When both ends of the first long sides and both ends of the second long sides of the permanent magnet are located at the intersections (A1, A2 and B1, B2) of the d-axial and q-axial hyperbolic functions as described above, the angular coordinates of the points on the circumscribing circle which define the respective hyperbolas (the d-axial flux line and the q-axial flux line) satisfy formula (4) below.

$$-\frac{34}{p} < \theta_{dB1} - \theta_{dA1} < \frac{22}{p} \quad (4)$$

$$-\frac{34}{p} < \theta_{dB2} - \theta_{dA2} < \frac{22}{p}$$

As shown in FIG. 2, in this embodiment, the first cavity layer (the first flux barrier), which includes the first magnet embedding holes 34A and the first permanent magnets M1, are formed and arranged along the first q-axial flux line $f_q(\theta_{qA})$ discussed above. As to the first permanent magnets M1, its dimensions are set according to the linear line (A1-A2), and further, the magnetizing surface (the first long side 37a) is placed in the position coinciding with the linear line (A1-A2).

Similarly, the second cavity layer (the second flux barrier), which includes the second magnet embedding holes 34B and the second permanent magnets M2 are formed and arranged along the second q-axial flux line $f_q(\theta_{qB})$ discussed above. As to the second permanent magnet M2, its dimensions are set according to the linear line (B1-B2), and further, the magnetizing surface (the second long side 43a) is placed in the position coinciding with the linear line (B1-B2).

The permanent magnet-type rotary electric machine 10 configured as described above produces magnet torque created by the magnetic fluxes of the first and second permanent magnets M1 and M2 and the action of the armature current and also reluctance torque created by magnetic saliency as viewed from the armature winding 18, at the same time.

Figure 4:
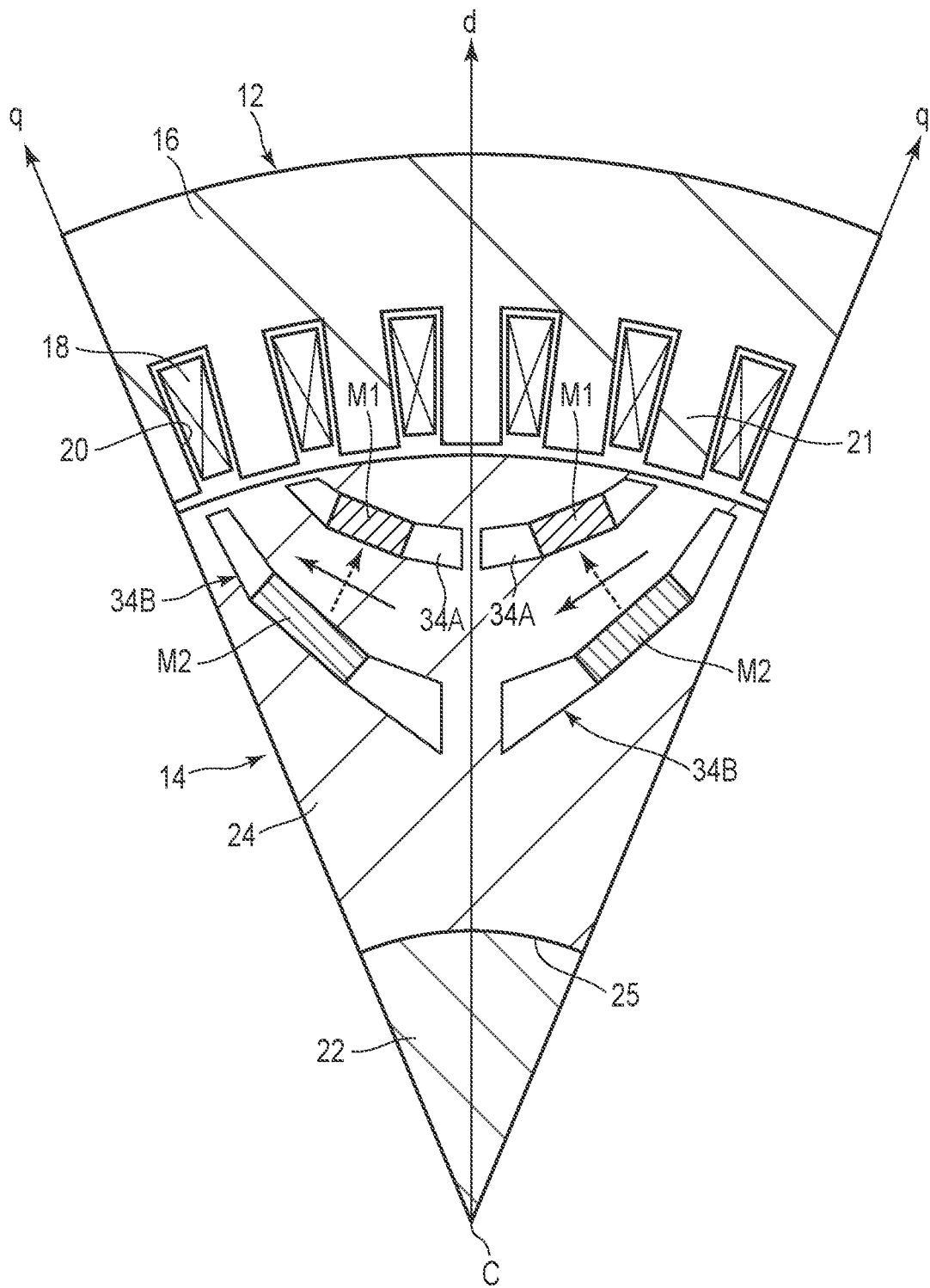
FIG. 4 is a cross-sectional view of one magnetic pole portion of the rotary electric machine, which shows an example of a magnetic flux vector when permanent magnets are appropriately arranged.

FIG. 4 shows vectors (as indicated by dotted arrows) of magnetic fluxes of d-axial magnets between the first cavity layer and the second cavity layer in the rotary electric machine 10 and vectors (as indicated by solid arrows) of reaction magnetic fluxes of q-axial armatures. The magnetic fluxes of the d-axial magnets affect the magnet torque, and the reaction magnetic fluxes of the q-axial armatures affect the reluctance torque. As shown, in the rotary electric machine 10 of this embodiment, the vectors of the magnetic fluxes of the d-axial magnets and the vectors of the reaction magnetic flux of the q-axial armatures are produced directions substantially normal to each other. Thus, the interference in magnetic flux between the d-axis and the q-axis can be reduced to low, making it possible to produce the two kinds of torques, namely, the magnet torque and the reluctance torque, efficiently.

According to the rotary electric machine 10, the first cavity layer and the second cavity layer adopt the shapes and arrangement along the q-axial flux line. Therefore, the q-axial armature reaction magnetic fluxes which pass between the first cavity layer (the first flux barrier) and the second cavity layers (the second flux barrier) are distributed along the q-axial flux line. The first permanent magnets M1 and the second permanent magnets M2 embedded in the first cavity layer and the second cavity layer are disposed along the d-axial flux line of the same or sufficiently close range, and therefore the magnetic fluxes of the d-axial magnets are distributed along the d-axial flux line. As can be seen from the formulas (1) and (2) discussed above, the d-axial flux line and the q-axial flux line are normal to each other, and therefore, similarly, the two magnetic fluxes produced between the first cavity layer and the second cavity layer are normal to each other. Therefore, the rotary electric machine 10 and the rotor 14 suppress the interaction of the magnetic fluxes between the d-axis and the q-axis, thereby making it possible to obtain a high torque without increasing the magnet amount.

Figure 5:
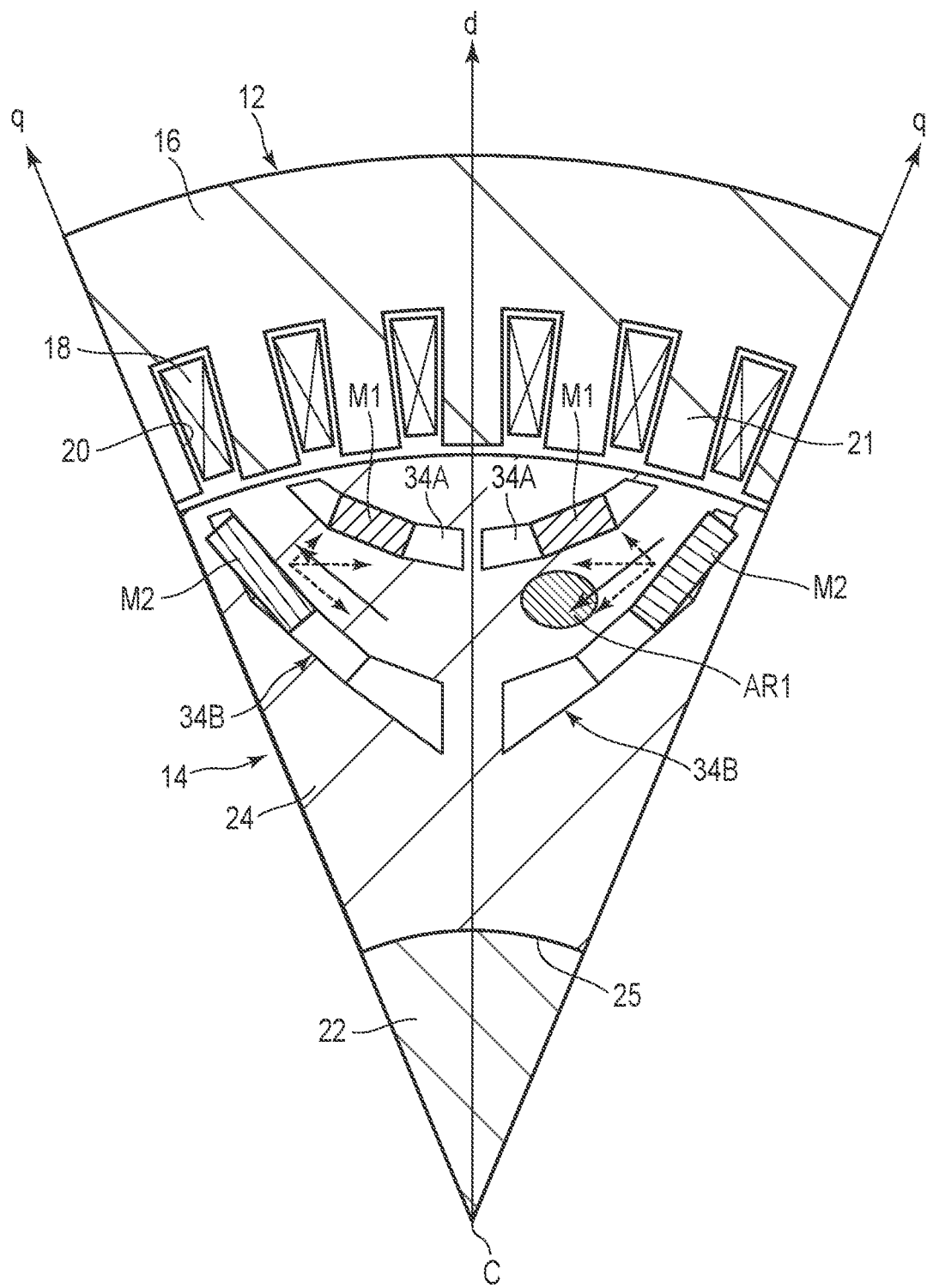
FIG. 5 is a cross-sectional view of one magnetic pole portion of the rotary electric machine, which shows an example of the magnetic flux vector when the permanent magnets are disposed to be shifted to an outer circumferential side.

FIG. 5 shows, as a comparative example, the relationship between vectors (as indicated by dotted arrows) of magnetic fluxes of magnets in one magnetic polar of the rotor and vectors (as indicated by solid arrows) of reaction magnetic fluxes of q-axial armatures when the second permanent magnets M2 are placed in positions shifted from the desired positions to the outer circumferential side. As shown, the magnetic flux of each magnet from the second permanent magnet M2 toward the first permanent magnet M1 includes a component of the same direction as that of the magnetic flux of the armature reaction. Thus, a regional magnetic saturation occurs in the vicinity of an area AR1 shown in the figure, and thus the magnetic flux of the armature reaction between the first layer and the second layer is decreased.

Figure 6:
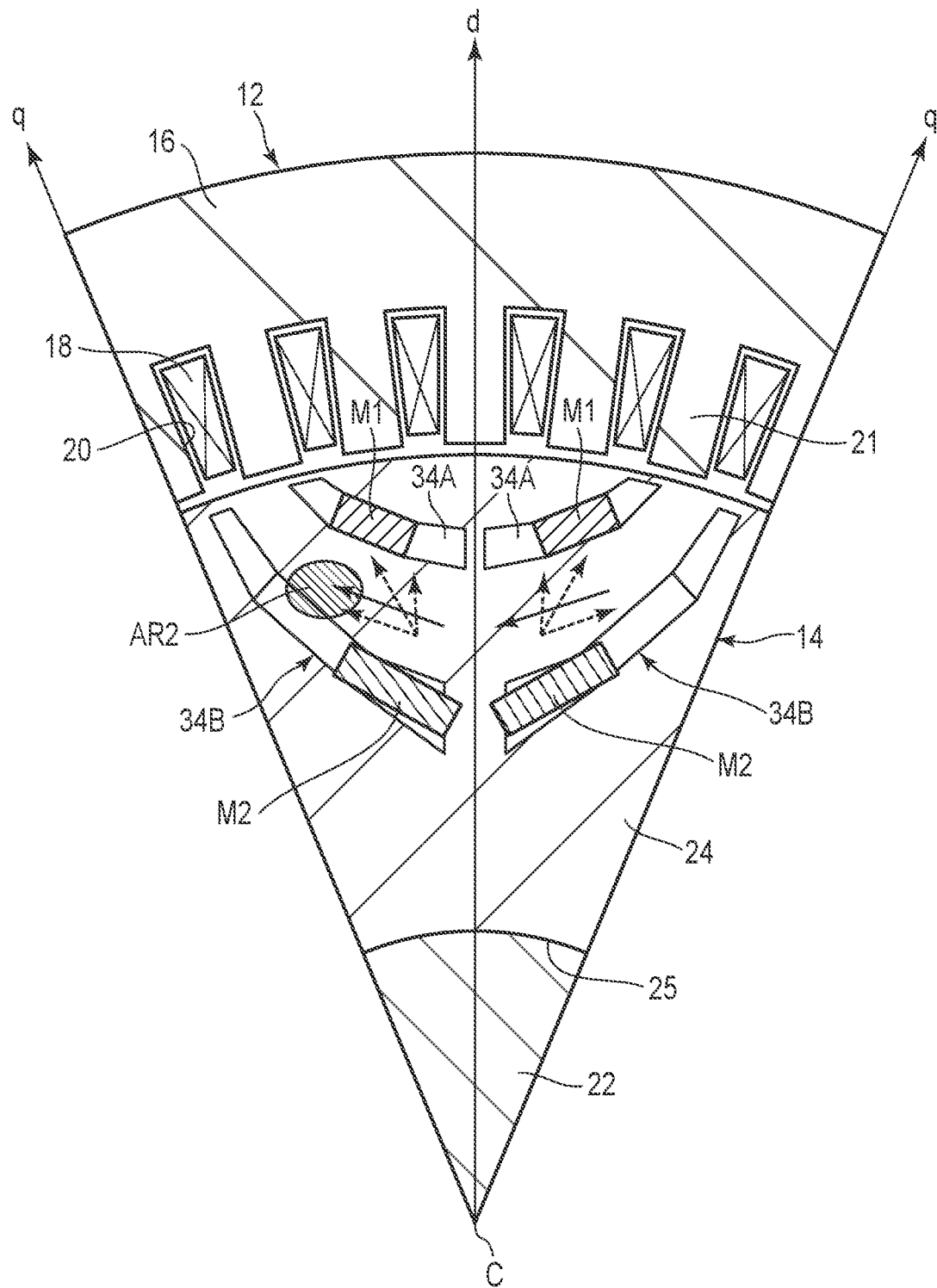
FIG. 6 is a cross-sectional view of one magnetic pole portion of the rotary electric machine, which shows an example of the magnetic flux vector when the permanent magnets are disposed to be shifted to an inner circumferential side.

FIG. 6 shows, as another comparative example, the relationship between vectors (as indicated by dotted arrows) of magnetic fluxes of magnets in one magnetic polar of the rotor and vectors (as indicated by solid arrows) of reaction magnetic fluxes of q-axial armatures when the second permanent magnets M2 are placed in positions shifted from the desired positions to the inner circumferential side. As shown, the magnetic flux of each magnet from the second permanent magnet M2 toward the first permanent magnet M1 includes a component of the same direction as that of the magnetic flux of the armature reaction. Thus, a regional magnetic saturation occurs in the vicinity of an area AR2 shown in the figure, and thus the magnetic flux of the armature reaction between the first layer and the second layer is decreased.

Figure 7:
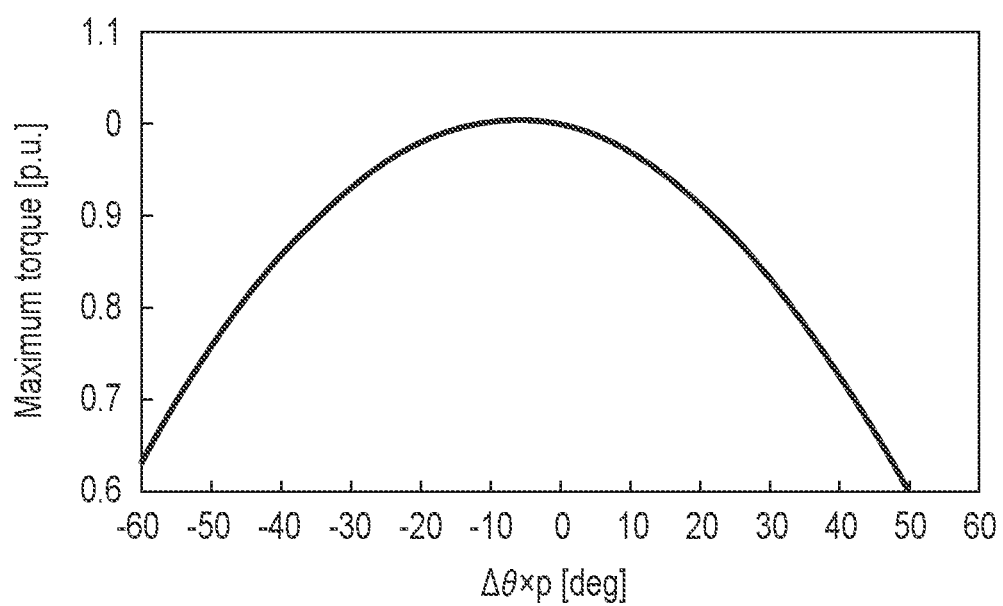
FIG. 7 is a diagram illustrating a variation in maximum torque when a first permanent magnet is fixed and arrangement of a second permanent magnet is changed to satisfy the relationship: $\theta_{dB1} - \theta_{dA1} = \theta_{dB2} - \theta_{dA2} = \Delta\theta$.

FIG. 7 shows the results of evaluation on the influence on torque by electromagnetic field analysis when the coordinates $\theta_{dA1}$ and $\theta_{dA2}$ shown in the FIG. 3 are fixed and the coordinates $\theta_{dB1}$ and $\theta_{dB2}$ are changed in the same direction, that is, the positions where the second permanent magnets M2 are disposed are changed. Note that the lateral axis indicates numerical values obtained by multiplying the amount of displacement $\Delta\theta$ of the coordinates by a pole logarithm p. As can be seen from FIG. 7, when $\Delta\theta \times P$ is in a range of −34 to 22 (a range where the decrease in torque is 10% or less), preferably, in a range of −22 to 9 (a range where the decrease in torque is 3% or less), more preferably, in a range of −15 to 5 (a range where the decrease in torque is 1% or less), or further more preferably, in a range of −10 to −1 (a range where the decrease in torque is 0.1% or less), a high torque is obtained, and the torque is decreased as spaced away from $\Delta\theta=0$. From the analytic verification thus provided as well, the influence of the magnetic flux interference between the d-axis and the q-axis can be also confirmed.

As described above, according to this embodiment, a plurality of cavity layers (flux barriers) each including magnet embedding holes and permanent magnets are provided in the rotor core of the rotor, and the arrangement and dimensions of the permanent magnets are set to satisfy the geometric condition described above between cavity layers including at least two permanent magnets adjacent to each other along the diametrical direction of the rotor. With this structure, a rotor which can achieve high torque and a permanent magnet-type rotary electric machine can be obtained without increasing the magnet amount.

Next, rotors of rotary electric machines according to modified examples will be described. In the modified examples described below, portions equivalent to those of the above-provided embodiments are denoted by the same reference numbers and detailed explanations thereof are omitted or only briefly provided, and such explanation are mainly given to portions different from those of the above-provided embodiment.

FIRST MODIFIED EXAMPLE

Figure 8:
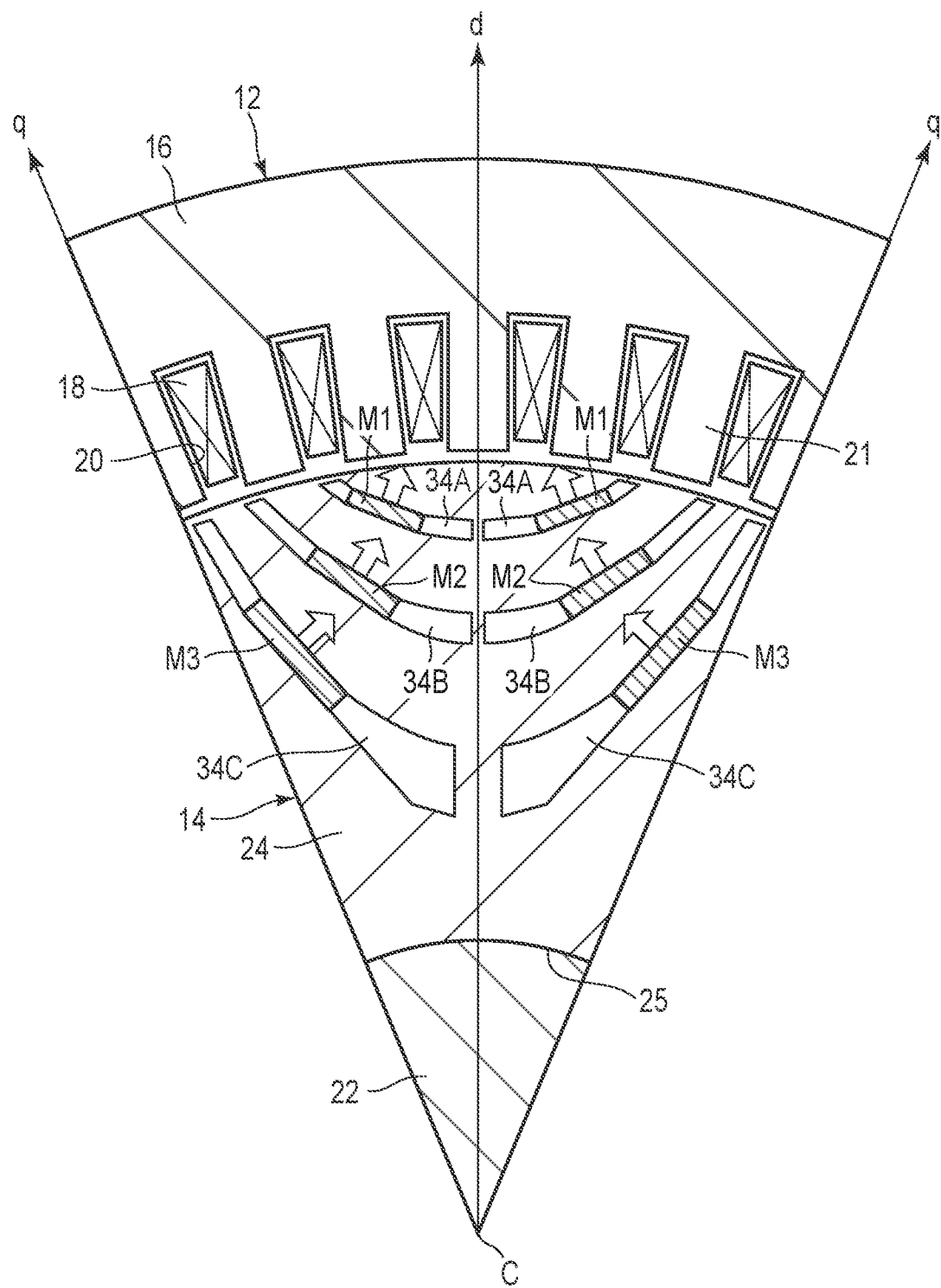
FIG. 8 is a lateral cross-sectional view showing one magnetic pole portion of a rotary electric machine according to the first modified example.

FIG. 8 is a lateral cross section showing one magnetic pole portion of a rotary electric machine according to the first modified example.

As to the cavity layers (flux barriers) of the rotor, it is not limited to two layers of the first cavity layer and the second cavity layer described above, but there may be three or more cavity layers provided. As shown in FIG. 8, the rotor 14 includes three cavity layers in the first modified example. That is, the rotor 14 comprises a first cavity layer including a first magnet embedding hole 34A and a first permanent magnet M1, a second cavity layer including a second magnet embedding hole 34B and a second permanent magnet M2 and a third cavity layer including a third magnet embedding hole 34C and a third permanent magnet M3. The third cavity layer is provided along an arbitrary third q-axial flux line in the inner circumferential side of the second cavity layer.

When three permanent magnet M1, M2 and M3 are provided, the arrangement and dimensions of the first, second and third permanent magnets are determined so that the condition of the above-described formula (4) is established between the first permanent magnet M1 and the second permanent magnet M2 adjacent to each other and between the second permanent magnet M2 and the third permanent magnet M3. Thus, in the first modified example as well, an advantageous operational effect similar to that of the above-described embodiment can be exhibited.

SECOND MODIFIED EXAMPLE

Figure 9:
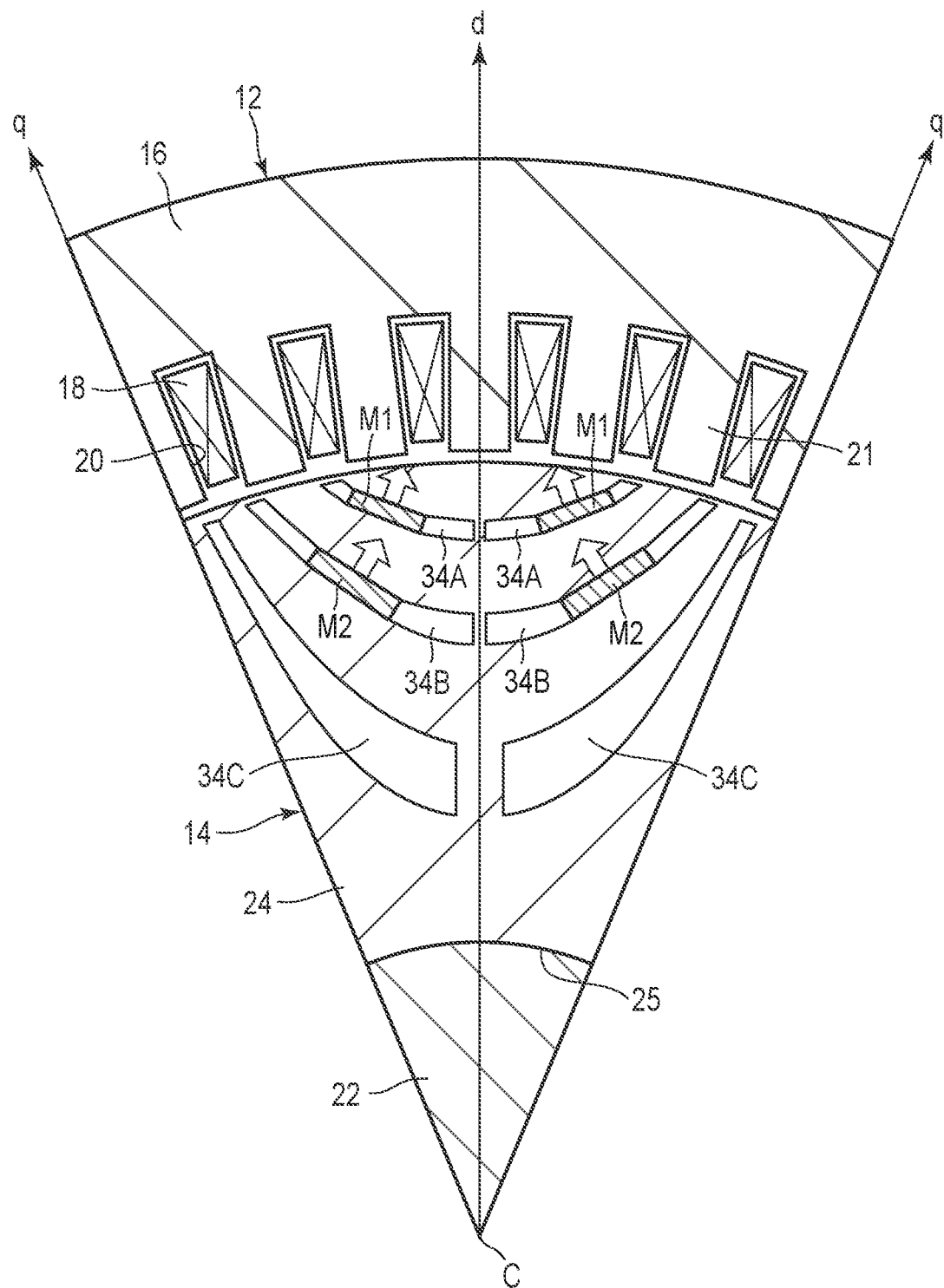
FIG. 9 is a lateral cross-sectional view showing one magnetic pole portion of a rotary electric machine according to the second modified example.

FIG. 9 is a lateral cross section showing one magnetic pole portion of a rotary electric machine according to the second modified example.

In a rotor comprising three or more cavity layers (flux barriers), they may include a cavity layer which does not comprise a permanent magnet. As shown in FIG. 9, according to the second modified example, the rotor 14 comprises a first cavity layer including a first magnet embedding hole 34A and a first permanent magnet M1, a second cavity layer including a second magnet embedding hole 34B and a second permanent magnet M2 and a third cavity layer including a third magnet embedding hole 34C (a flux barrier) without a permanent magnet. Thus, between the first permanent magnet M1 and the second permanent magnet M2 adjacent to each other, the arrangement and dimensions of the first and second permanent magnets are determined so that the condition of the previously described formula (4) is established. In the second modified example as well, an advantageous operational effect similar to that of the above-described embodiment can be exhibited.

THIRD MODIFIED EXAMPLE

Figure 10:
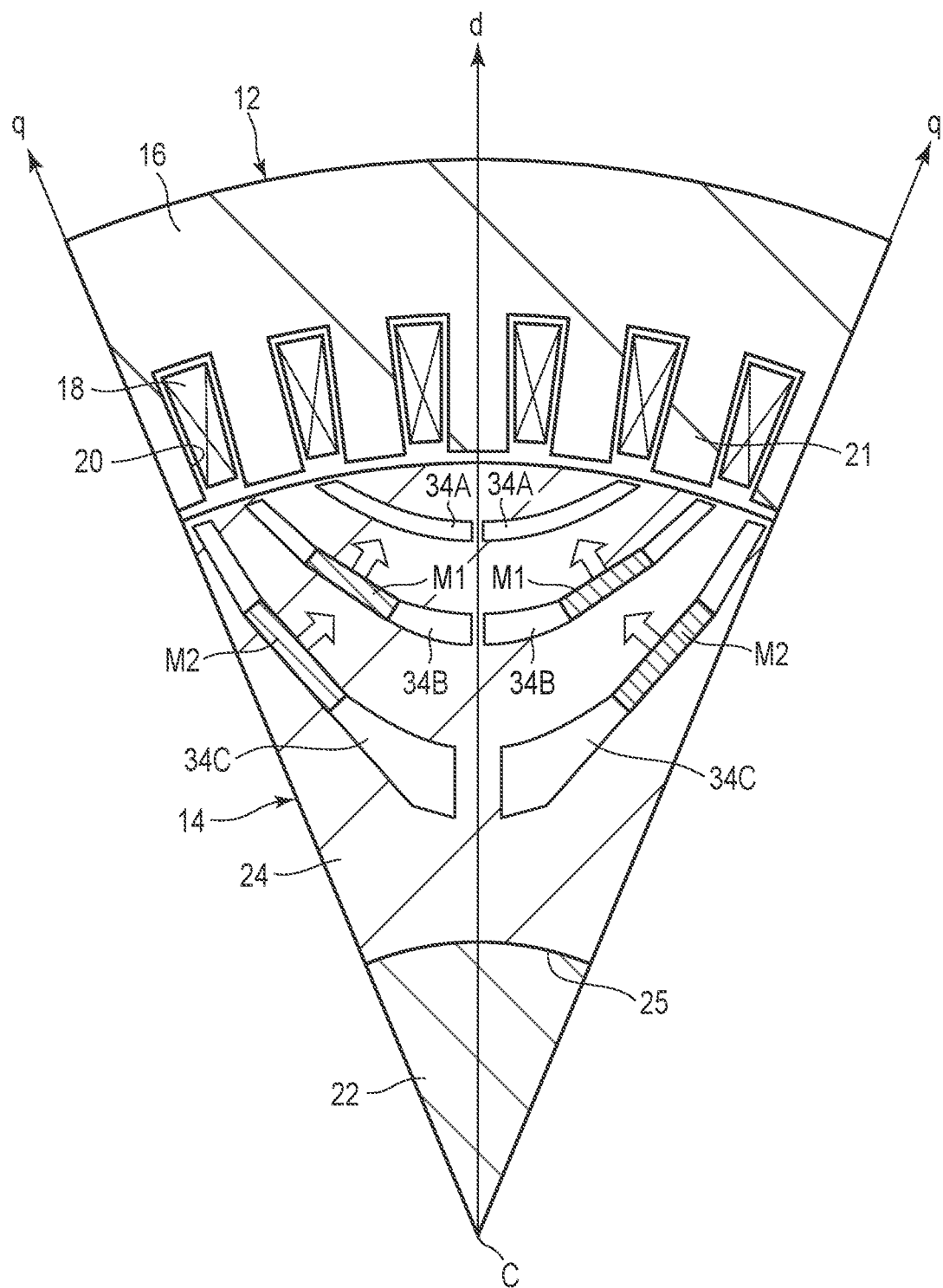
FIG. 10 is a lateral cross-sectional view showing one magnetic pole portion of a rotary electric machine according to the second modified example.

FIG. 10 is a lateral cross section showing one magnetic pole portion of a rotary electric machine according to the third modified example.

According to the third modified example, the rotor 14 comprises a first cavity layer including a first magnet embedding hole 34A (a flux barrier) without a permanent magnet, a second cavity layer including a second magnet embedding hole 34B and a first permanent magnet M1 a second permanent magnet M2 and a third cavity layer including a third magnet embedding hole 34C and a second permanent magnet M2. Thus, between the first permanent magnet M1 and the second permanent magnet M2 adjacent to each other, the arrangement and dimensions of the first and second permanent magnets are determined so that the condition of the previously described formula (4) is established. In the third modified example as well, an advantageous operational effect similar to that of the above-described embodiment can be exhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, dimensions, shape and the like of the rotor are not limited to those discussed in the above-provided embodiments, but can be variously changed depending on design. The cross-sectional shape of the permanent magnets is not limited to the rectangular parallelepiped, but may be some other shape, for example, trapezoidal. For each permanent magnet, such a magnet prepared by attaching a plurality of permanent magnets together into a desired shape may be used. In each magnetic pole, the first cavity layer and the second cavity layer are formed and disposed to be line-symmetrical on right and left sides with respect to the d-axis. But, the embodiments are not limited to this structure, but they can be disposed to be asymmetrical on right and left sides.

What is claimed is:

1. A rotor of a rotary electric machine comprising: a shaft rotatable around a central axis; a rotor core comprising a plurality of magnetic poles arranged along a circumferential direction and fixed coaxially to the shaft; and a first permanent magnet and a second permanent magnet, disposed in a plurality of layers of flux barriers formed in the plurality of magnetic poles, respectively, wherein in a lateral cross section of the rotor core, normal to the central axis, when an axis extending from the central axis in a diametrical direction between each adjacent pair of the magnetic poles is referred to as a q-axis, and an axis electrically normal to the q-axis is referred to as a d-axis in each of the magnetic poles, the flux barrier of each of the magnetic poles includes a first flux barrier provided between the d-axis and the q-axis and a second flux barrier provided in an inner circumferential side the rotor core with respect to the first flux barrier between the d-axis and the q-axis, the first flux barrier is formed between a first outer circumferential-side edge extending from a vicinity of the d-axis to a vicinity of an outer circumference of the rotor core, and a first inner circumferential-side edge extending from a vicinity of the d-axis to a vicinity of the circumference and located an inner circumferential side of the rotor core with respect to the first outer circumferential-side edge with a gap therebetween, the second flux barrier is formed between a second outer circumferential-side edge located on an inner circumferential side of the rotor core with respect to the first inner circumferential-side edge with a gap therebetween and extending from the vicinity of the d-axis to the vicinity of the outer circumference of the rotor core, and a second inner circumferential-side edge extending from the vicinity of the d-axis to the vicinity of the circumference and located on the inner circumferential side of the rotor core with respect to the second outer circumferential-side edge with a gap therebetween, the first permanent magnet has a cross-sectional shape comprising a first long side with an inner end and an outer end, a first short side intersecting the inner end of the first long side and a second short side intersecting the outer end of the first long side, the first permanent magnet is disposed in the first flux barrier in a state that the first long side opposes the first outer circumferential-side edge of the first flux barrier, the inner end and the first short side are located on a side of the d-axis, and the outer end of the first long side and the second short side are located in the outer circumferential side of the rotor core, and the second permanent magnet has a cross-sectional shape comprising a second long side with an inner end and an outer end, a third short side intersecting the inner end of the second long side and a fourth short side intersecting the outer end of the second long side, the second permanent magnet is disposed in the second flux barrier in a state that the second long side opposes the second outer circumferential-side edge of the second flux barrier, the inner end and the third short side are located on a side of the d-axis, and the outer end of the second long side and the fourth short side are located in the outer circumferential side, and where, R: represents a radius of a circle around the central axis, which circumscribes the circumference of the rotor core;

r: represents radial coordinates of a polar coordinate system interposed between with the d-axis and q-axis with respect to the central axis as a central point;

θ: represents angular coordinates of the polar coordinate system interposed between the d-axis and q-axis with respect to the central axis;

p: represents the number of pairs of poles pairs (the number of magnetic poles/2)

$\theta_a$: represents angular coordinates of an arbitrary point of the circumscribing circle, a flux line in a d-axial direction passing through coordinates (R, $\theta_a$) is defined by formula (1) below, $$(r/R)^P \cdot \cos(p\theta) = \cos(p\theta_a) \quad (1)$$

a flux line in a q-axial direction passing through coordinates (R, $\theta_a$) is defined by formula (2) below, $$(r/R)^P \cdot \sin(p\theta) = \sin(p\theta_a) \quad (2)$$

and when angular coordinates of an intersection of the flux line in the d-axial direction passing through an outer end A1 of the first long side of the first permanent magnet and the circumscribing circle are defined as θdA1, and angular coordinates of an intersection of the flux line in the d-axial direction passing through an inner end A2 of the first long side of the first permanent magnet and the circumscribing circle are defined as θdA2, and angular coordinates of an intersection of the flux line in the d-axial direction passing through an outer end B1 of the second long side of the second permanent magnet and the circumscribing circle are defined as θdB1, and angular coordinates of an intersection of the flux line in the d-axial direction passing through an inner end B2 of the second long side of the second permanent magnet and the circumscribing circle are defined as θdB2, the θdA1, θdA2, θdB 1 and 6dB2 satisfy formula (3) below:

$$-\frac{34}{p} < \theta_{dB1} - \theta_{dA1} < \frac{22}{p} \quad (3)$$
$$-\frac{34}{p} < \theta_{dB2} - \theta_{dA2} < \frac{22}{p}$$

2. The rotor of claim 1, wherein the θdA1, θdA2, θdB 1 and 6dB2 satisfy formula (4) below:

$$-\frac{22}{p} < \theta_{dB1} - \theta_{dA1} < \frac{9}{p} \quad (4)$$
$$-\frac{22}{p} < \theta_{dB2} - \theta_{dA2} < \frac{9}{p}$$

3. Rotor of claim 1, wherein
the θdA1, θdA2, θdB 1 and 6dB2 satisfy formula (5) below:

$$-\frac{15}{p} < \theta_{dB1} - \theta_{dA1} < \frac{5}{p} \quad (5)$$
$$-\frac{15}{p} < \theta_{dB2} - \theta_{dA2} < \frac{5}{p}$$

4. The rotor of claim 1, wherein the θdA1, θdA2, θdB 1 and 6dB2 satisfy formula (6) below:

$$-\frac{10}{p} < \theta_{dB1} - \theta_{dA1} < -\frac{1}{p} \quad (6)$$
$$-\frac{10}{p} < \theta_{dB2} - \theta_{dA2} < -\frac{1}{p}$$

5. The rotor of claim 1, wherein
the outer end A1 of the first permanent magnet is located at an intersection of the flux line in the d-axial direction passing through θdA1 and a first flux line in a q-axial direction, and the inner end A2 of the first permanent magnet is located at an intersection of the first flux line in the q-axial direction and the flux line in the d-axial direction passing through and θdA2.

6. The rotor of claim 5, wherein
the outer end B1 of the second permanent magnet is located at an intersection of the flux line in the d-axial direction passing through the θdB1 and a second flux line in a q-axial direction, and the inner end B2 of the second permanent magnet is located at an intersection of the second flux line in the q-axial direction and the flux line in the d-axial direction passing through the θdB2.

7. The rotor of claim 1, wherein
in the respective magnetic poles,
the first flux barriers each comprise an inner end adjacent to the d-axis and an outer end adjacent to the outer circumference of the rotor core, and are arranged such that a distance from the d-axis expands from the inner end towards the outer end, and the second flux barriers each comprise an inner end adjacent to the d-axis and an outer end adjacent to the outer circumference of the rotor core, and are arranged such that a distance from the d-axis expands from the inner end towards the outer end.

8. The rotor of claim 7, wherein the first flux barriers each comprise a magnet loading region where the first permanent magnet is disposed, an inner-side cavity extending from the magnet loading region towards the d-axis, and an outer-side cavity extending from the magnet loading region towards the outer circumference of the rotor core, the second flux barriers each comprise a magnet loading region where the second permanent magnet is disposed, an inner-side cavity extending from the magnet loading region towards the d-axis, and an outer-side cavity extending from the magnet loading region towards the outer circumference of the rotor core, and the rotor core comprises a first bridge portion formed between the inner-side cavity of the first flux barrier and the d-axis, first outer circumferential bridge portion formed between the outer-side cavity of the first flux barrier and the outer circumference of the rotor core, a second bridge portion formed between the inner-side cavity of the second flux barrier and the d-axis, and a second outer circumferential bridge portion formed between the outer-side cavity of the second flux barrier and the outer circumference of the rotor core.

\* \* \* \* \*

UNITED STATES PATENT AND TRADEMARK OFFICE
CERTIFICATE OF CORRECTION

PATENT NO. : 11,909,267 B2
APPLICATION NO. : 17/149819
DATED : February 20, 2024
INVENTOR(S) : Hiroaki Makino et al.

It is certified that error appears in the above-identified patent and that said Letters Patent is hereby corrected as shown below:

In the Claims

Column 15, Claim 1, Line 49, please change the formula from "$(r/R)P \cdot \cos(pq)=\cos(pqa)$ (1)" to "$(r/R)^p \cdot \cos(p\theta)=\cos(p\theta_a)$ (1)"

Column 15, Claim 1, Line 53, please change the formula from "$(r/R)P \cdot \sin(pq)=\sin(pqa)$ (2)" to "$(r/R)^p \cdot \sin(p\theta)=\sin(p\theta_a)$ (2)".

Column 15, Claim 1, Line 58, please change from "θdA1" to "$\theta_{dA1}$".

Column 15, Claim 1, Line 62, please change from "θdA2" to "$\theta_{dA2}$".

Column 15, Claim 1, Line 66, please change from "θdB1" to "$\theta_{dB1}$".

Column 16, Claim 1, Line 3, please change from "θdB2" to "$\theta_{dB2}$".

Column 16, Claim 1, Line 4, please change from "the θdA1, θdA2, θdB 1 and 6dB2" to "the $\theta_{dA1}$, $\theta_{da2}$, $\theta_{dB1}$ and $\theta_{dB2}$".

Column 16, Claim 2, Line 14, please change from "the θdA1, θdA2, θdB 1 and 6dB2" to "the $\theta_{dA1}$, $\theta_{da2}$, $\theta_{dB1}$ and $\theta_{dB2}$".

Column 16, Claim 3, Line 23, please change from "Rotor of claim 1, wherein" to "The Rotor of claim 1, wherein".

Column 16, Claim 3, Line 24, please change from "the θdA1, θdA2, θdB 1 and 6dB2" to "the $\theta_{dA1}$, $\theta_{da2}$, $\theta_{dB1}$ and $\theta_{dB2}$".

Column 16, Claim 4, Line 34, please change from "the θdA1, θdA2, θdB 1 and 6dB2" to "the $\theta_{dA1}$, $\theta_{da2}$, $\theta_{dB1}$ and $\theta_{dB2}$".

Signed and Sealed this
Second Day of September, 2025

Coke Morgan Stewart
*Acting Director of the United States Patent and Trademark Office*

CERTIFICATE OF CORRECTION (continued)
U.S. Pat. No. 11,909,267 B2

Column 16, Claim 5, Line 47, please change from "θdA1" to "θ$_{dA1}$".

Column 16, Claim 5, Line 51, please change from "θdA2" to "θ$_{dA2}$".

Column 16, Claim 6, Line 55, please change from "θdB1" to "θ$_{dB1}$".

Column 16, Claim 6, Line 60, please change from "θdB2" to "θ$_{dB2}$".

Column 16, Claim 6, Line 60, please change from "θdB2" to "θ$_{dB2}$".

Column 17, Claim 8, Line 21, please change from "first outer circumferential bridge" to "a first outer circumferential bridge".